Jan. 25, 1966 R. R. RIESZ 3,231,687

ECHO SUPPRESSOR WITH IMPROVED BREAK-IN

Filed Dec. 29, 1961 3 Sheets-Sheet 1

INVENTOR
R. R. RIESZ
BY F. W. Adams, Jr.
ATTORNEY

Jan. 25, 1966 R. R. RIESZ 3,231,687

ECHO SUPPRESSOR WITH IMPROVED BREAK-IN

Filed Dec. 29, 1961 3 Sheets-Sheet 2

INVENTOR
R. R. RIESZ
BY F. W. Adams, Jr.

ECHO SUPPRESSOR WITH IMPROVED BREAK-IN

Filed Dec. 29, 1961

INVENTOR
R. R. RIESZ
BY [signature]
ATTORNEY 3,231,687

ECHO SUPPRESSOR WITH IMPROVED BREAK-IN

Robert R. Riesz, Chatham, N.J., assignor to Bell Telephone Laboratories, Incorporated, New York, N.Y., a corporation of New York Filed Dec. 29, 1961, Ser. No. 163,182
7 Claims. (Cl. 179—170.2)

This invention relates to a break-in method for use with echo suppressors and more particularly to a break-in method which is dependent upon the difference between the syllabic time patterns of speech signals for operation.

It is the usual practice in telephone transmission systems to interconnect the two-wire local lines by four-wire circuits. Such a system is particularly advantageous where the local terminals are joined by way of radio facilities because the four-wire link provides two separate one-way paths each transmitting signals in opposite directions between stations. The two-wire circuit provides only a single two-way path. The two-wire local line is usually joined to the four-wire system by a hybrid coil. Thus, it is quite likely that a part of the energy which is transmitted to the two-wire link over one of the paths of the four-wire link will be reflected over the other path of the four-wire system. This return signal energy, which is inherent in two-wire to four-wire communication systems, is termed an echo.

If the return echo encounters a delay due to the characteristics of the transmitting medium, serious difficulties will be encountered, viz., the speaker will hear the syllables of his last talk spurt. It has been found that an echo encountering a round trip delay below approximately 50 milliseconds is not readily discernable and therefore not objectionable. However, certain newly proposed transmission systems, such as those employing an earth satellite as a repeater station or a transmission system utilizing long lines for the transmission of energy, are known to introduce a round trip delay to signals of up to 0.6 second. It is therefore necessary in such telephone transmission systems to provide some means of attenuating echo signals which might arise therein.

A prior solution to the echo problem has been the use of split terminal echo suppressors. In this arrangement, an echo suppressor is associated with each subscriber's terminal. When the first subscriber begins speaking and his speech signals are received at the terminal of the second subscriber, the echo suppressor will be actuated to thereupon disable the transmitting path of the four-wire circuit associated with the second subscriber. Since this transmission path is effectively disabled, no signals can be transmitted back to the first subscriber and echoes are thereby attenuated.

Although the use of echo suppressors effectively eliminates the annoying echoes in the two-wire to four-wire communication system, another problem arises by their use. Since the transmitting path of the second subscriber is disabled while the first subscriber is speaking, it is quite obvious that the second subscriber must wait until the first subscriber has ceased speaking before he will be able to transmit his information to the first subscriber. To compound this problem even further, if both subscribers begin speaking at approximately the same moment, each subscriber will thereupon operate the echo suppressor associated with the opposite subscriber and thus completely prevent the transmission of the signal energy or, at best, the speech will be transmitted as chopped bursts.

A partial solution to the so-called "lockout" condition noted above has been the use of "break-in" arrangements in conjunction with the echo suppressors. A break-in arrangement allows the interrupting subscriber to gain control of the transmission path by disabling the echo suppressor associated with his terminal albeit the first subscriber is still talking. Thus, the interrupting subscriber is effectively "breaking into" the first subscriber's conversation. The most prevalent type of break-in systems is the so-called "amplitude logic" arrangement. The operation of this arrangement is based upon the differential between the amplitudes of the signal produced by the interrupting subscriber and the amplitude of the echo. When the level of the signal generated by the interrupting subscriber is above a predetermined level, the break-in arrangement will disable the echo suppressor. One inherent disadvantage of this method lies in the fact that the interrupting, or second, subscriber may be a so-called weak speaker and may not be able to produce a signal which has an amplitude above the aforemented predetermined level. Thus, the interrupting party will not be able to disable the suppressor associated with his terminal when the other subscriber is talking. A further disadvantage of such an arrangement is the inability of the circuitry to discern the difference between an echo and the interrupting party's speech signal. Thus, there is a possibility of a strong echo operating the break-in elements to thereby disable the suppressor.

Accordingly, it is an object of the present invention to provide a break-in arrangement for use with an echo suppressor which operates upon a basis other than the amplitude basis thereby making the system independent of the relative amplitudes of the echoes and the signals.

Another object of the present invention is to provide a break-in arrangement for use with an echo suppressor which will satisfactorily disable the suppressor when the interrupting party speaks even though the other party is still speaking and which will not be responsive to echoes.

In accordance with one embodiment of the present invention an echo suppressor is connected, in the conventional manner, to the receiving path of the four-wire system, through a first control device. An energizing source for this first control is connected between a second and a third control device. The second control is connected to the receiving path; the third control is connected to the transmitting path. The invention is based upon the correspondence in time of both the primary signal produced by the far-end subscriber and the echo produced by the primary signal. Thus, when signal energy is received at the near-end terminal and an echo is produced thereby, the second and third controls will operate in unison and the souce will not be connected to the first control device. However, when voice signals produced by the interrupting subscriber are detected in the transmitting path by the control circuit, only the third control circuit will operate thereby connecting the source to the first control and energizing this control device. The first control will thereupon effectively disconnect the echo suppressor from the receiving path thereby eliminating the attenuation introduced by the echo suppressor from the transmitting path.

In another embodiment of the present invention the echo suppressor is disabled by the break-in circuitry which thereupon operates to introduce a small amount of attenuation into the transmitting path. The value of the attenuation is so chosen that the echoes will be attenuated but the speech signals will not be interfered with to any appreciable extent.

The above and other features of the invention will be described in the following specification taken in conjunction with the drawings in which.

Figure 1:
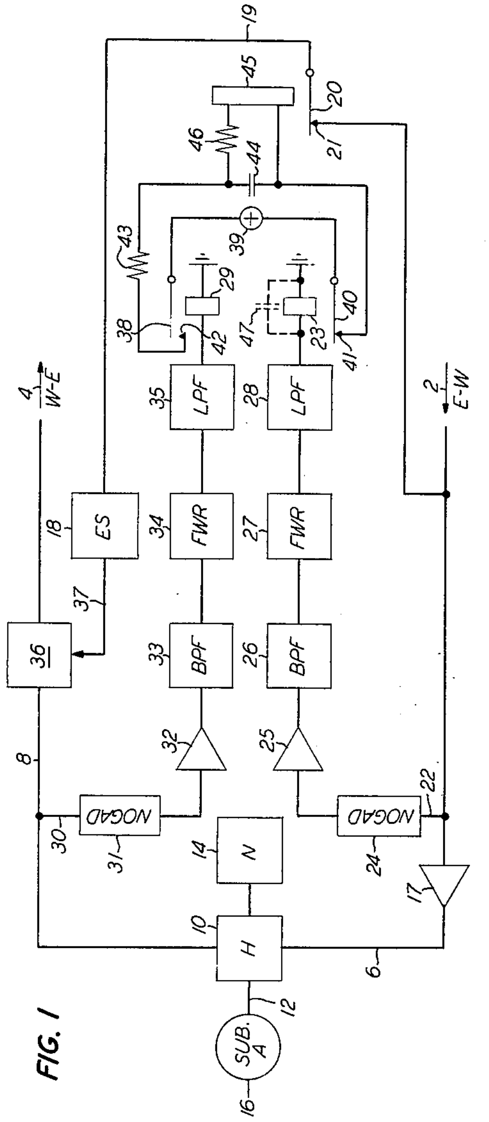
FIG. 1 is a schematic circuit diagram partially in block form of the break-in arrangement of the present invention.
Figure 4:
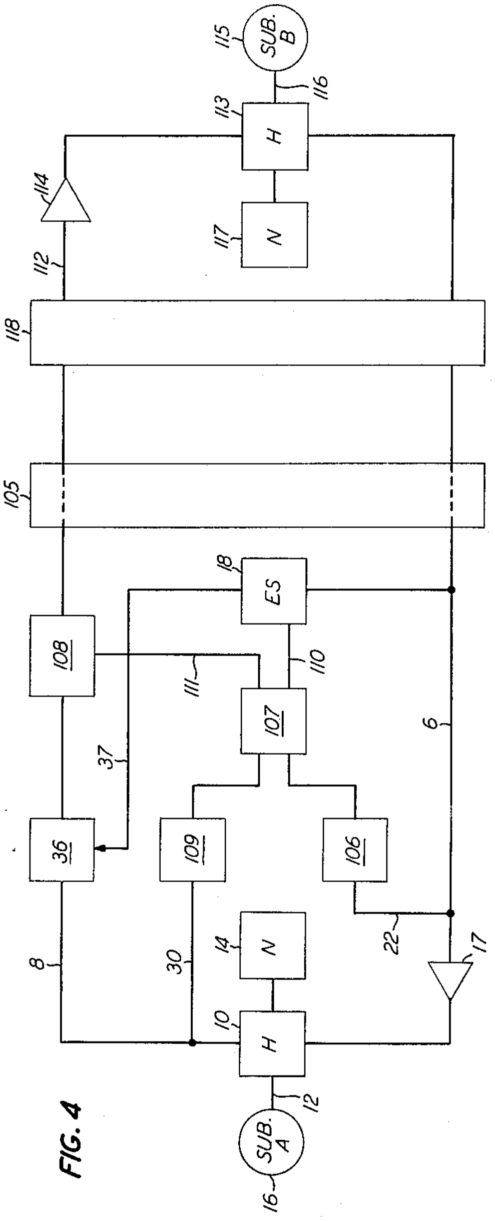
FIG. 4 is a block circuit diagram of a modification of the present invention wherein adidtional attenuation is introduced in the transmission path when the echo suppressor is disabled.

It is to be understood that the single interconnecting transmission lines depicted in FIGS. 1 and 4 are two leads. It is further to be noted that a break-in arrangement for only one terminal will be disclosed since the break-in arrangement associated with the other terminal is identical to the arrangement shown. Like numerals in different figures indicate the same elements.

In accordance with the present invention, FIG. 1 shows the echo suppressor which is associated with the west, or near-end, terminal of the two-wire to four-wire transmission system. The signals transmitted from the east or far-end terminal, and therefore traveling from east to west as indicated by arrow 2, enter the west terminal by means of path 6. The signal transmitted from the west terminal via path 8 will be propagated in the direction indicated by arrow 4 towards the eastern terminal. Paths 6 and 8 join in a hybrid coil 10. Hybrid coil 10 is connected to subscriber A by local line 12 at one end and to a balancing network 14 at the other end. Line 12 terminates in the subscriber's handset 16.

A one-way amplifier 17 is serially connected in path 6 and serves to amplify the signals received in path 6. Echo suppressor control 18 is connected to path 6 by a lead 19 in which an armature 20 and a contact 21 are serially connected. A lead 22 connects path 6 to ground through the circuit comprising a nogad 24 (noise operated gain adjusting device), an isolation amplifier 25, a bandpass filter 26, a full-wave rectifier 27, a low pass filter 28 (which passes slowly varying syllabic energy only), and the winding of a relay 23. Similarly, path 8 is connected to ground by a lead 30 through the circuit elements comprising a nogad 31, an isolation amplifier 32, a bandpass filter 33, a full-wave rectifier 34, a low pass filter 35 and the winding of a relay 29.

An attenuator 36, such as an externally controlled variolosser of known construction, is connected serially in path 8. The output of echo suppressor control 18 is connected to attenuator 36 by a lead 37. The signals produced by control 18, and transmitted by lead 37 to attenuator 36, will actuate attenuator 36 to introduce attenuation in path 8 in response to these signals. Thus, elements 18 and 36 comprise the echo suppressor which may be any of the types now in use such as the amplitude type, which will introduce attenuation in path 8 in accordance with the amplitude of the signals existing in paths 6 and 8 as disclosed in Patent 2,257,806 to D. Mitchell and assigned to the assignees of the present invention.

A battery 39 is connected between armature 38 of relay 29, and armature 40 of relay 23. Under normal conditions (i.e., when the relays are de-energized), armature 40 will be connected to contact 41 and armature 38 will not be connected to contact 42. The series circuit comprising a current limiting resistor 43 and a capacitor 44 is connected between contacts 41 and 42. A current limiting resistor 46 is connected in series with the winding of relay 45. This series circuit is connected in parallel with capacitor 44. In the normal state, relay 45 will be de-energized hence armature 20 will be connected to contact 21 thereby connecting control 18 to path 6 through lead 19.

Figure 2A:
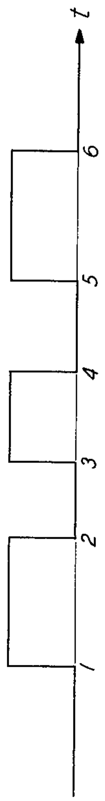
FIGS. 2A–2D are graphs of the syllabic speech bursts existing in the transmitting and receiving paths of the transmission system associated with the apparatus of FIG. 1.
Figure 2B:
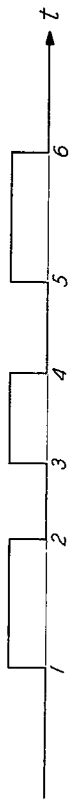

As noted hereinabove, the operation of the break-in arrangement of the present invention depends upon the correlation between the primary signal received in path 6 from the east end subscriber and the echo produced thereby. FIG. 2A shows, for example, a primary speech spurt as a function of time. FIG. 2B depicts the echo signal as a function of time which is reflected with negligible delay. It is to be noted that there is an exact coincidence in time between the echo signal and the primary signal. The primary signal in path 6 will be amplified by amplifier 17 and transmitted to handset 16 of subscriber A through hybrid coil 10 and line 12. A portion of this signal will also pass through nogad 24 and amplifier 25 and be filtered by bandpass filter 26. The output of filter 26 will be applied to the full-wave rectifier 27, which will rectify this signal and apply it to the low pass filter 28. The signal appearing at the output of filter 28 will thereupon energize relay 23.

As noted hereinabove, a portion of the signal reaching handset 16 will be reflected back to hybrid coil 10 and will thereupon be coupled into transmission path 8 as an echo signal. This reflected signal will be prevented from interfering with the incoming signal energy in path 6 by the isolation amplifier 17. Thus, the echo signal will pass through nogad 31, amplifier 32, filter 33, rectifier 34, and low pass filter 35 to thereby energize relay 29. Since both these relays (i.e., 23 and 29) will be energized in unison, due to the exact time correspondence between the primary and echo signals, source 39 will not be connected to the winding of relay 45. That is, when armature 38 is connected to contact 42, armature 40 will be disconnected from contact 41. Because relay 45 is not energized, control 18 will remain connected to path 6 through the connection of armature 20 and contact 21, and will be operated by the signals in path 6 to cause attenuator 36 to introduce attenuation in path 8. It is therefore seen that even the strongest echo will not disable control 18 since the only time echoes can arise is when signals are present in path 6 and the connection between 40 and 41 will be broken during these intervals.

Figure 2C:
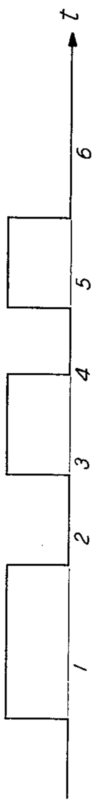

If a subscriber A begins to speak at the same time signals are received in path 6 from subscriber B, the syllabic envelope of his speech spurt may, for exemple, look like that shown in FIG. 2C as a function of time. By comparing FIGS. 2A and 2C it is noted that there is no coincidence between the speech burst pattern produced by A and the speech burst pattern produced by B and therefore, of necessity, between the pattern produced by A (FIG. 2C) and the echo (FIG. 2B).

Between time intervals 2 and 3 (FIG. 2A) no signals are received in path 6; however as a consequence of A's speech, energy will exist in path 8 during this interval (FIG. 2C). This energy will cause relay 29 to be energized, thereby connecting armature 38 to contact 42. Since there are no signals in path 6 armature 40 will be connected to contact 41 (i.e., relay 23 will be de-energized). Thus, source 39 will be connected, through resistors 43 and 46, to the winding of relay 45. The energization of relay 45 will cause the connection between armature 20 and contact 21 to be broken thereby disconnecting echo supressor control 18 from path 6. The disabling of control 18 will cause the attenuation in path 8, due to attenuator 36, to be reduced to zero.

Figure 2D:
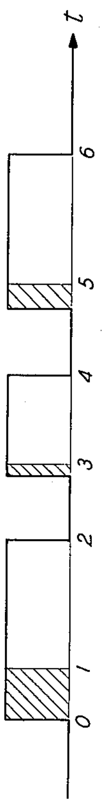

FIG. 2D shows the composite syllabic signal present in path 8, for the time interval 0 through 6, due to the presence of speech signals produced by A (FIG. 2C) and the echo (FIG. 2B). It is quite obvious that the time relay 29 only will operate is when signals produced by subscriber A only are present in path 8. These intervals are indicated by the cross-hatched areas in FIG. 2D. As soon as signals are received in path 6, relay 23 will be energized thereby disconnecting source 39 from the winding of relay 45 by breaking the connection between 40 and 41. If no provisions were made to compensate for this effect relay 45 would be de-energized every time both subscribers were talking thereby allowing control 18 to to reconnected to path 6 with the result that attenuation would again be placed in path 8. The repetitious operation of relay 45 would cause parts of the signals produced by A to be attenuated and the signals would reach B as chopped bursts of speech. To prevent this intermittent operation of relay 45 during double-talking, the charge on capacitor 44 due to source 39 will maintain relay 45 energized between the time intervals represented by the cross-hatched areas even though energizing source 39 is removed during the intervals between the areas. Thus, once subscriber A disables control 18, the control will remain inoperative during pauses in subscriber A's speech pattern.

Figures 3A, 3B:
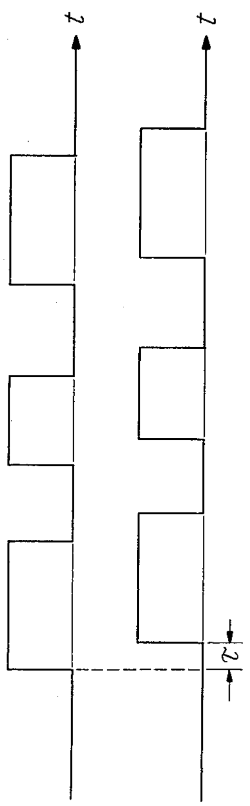
FIGS. 3A and 3B are graphs of the syllable speech bursts existing in the transmitting and receiving paths when there is end delay in the transmission system.

The operation of the above disclosed system proceeded on the assumption that there is an exact coincidence in time between the echo and the primary signal. However, this condition will not exist if there is a substantial time interval during which the signals from subscriber B will propagate down line 12 to subscriber A and be reflected back to hybrid 10 as echoes. (This condition is known as "end delay.") For this case the primary signal in path 6 may look like that shown in FIG. 3A as a function of time, while the echo signal may look like that depicted in FIG. 3B as a function of time. It is noted there is a delay $\tau$ between the primary signal and the echo. In such a case relay 29 will be energized, due to the delayed echo, when relay 23 is de-energized. This will cause false operation of the break-in arrangement as relay 45 will be energized, in the manner noted above, and disable the echo suppressor at a time when only echoes exist in path 8. To compensate for this end delay a capacitor 47, shown dotted in FIG. 1, is connected in parallel with the winding of relay 23. This capacitor serves to maintain relay 23 energized for the delay period $\tau$ (i.e., the capacitor is chosen so its discharge time is equal to $\tau$) thus preventing the energizing of relay 45 by opening the connection between 40 and 41.

The above embodiment makes no provision for any attenuation of echoes which will arise when the echo suppressor is disabled (i.e., at the time when both speakers are talking). These echoes will therefore return to the speaker along with the signals produced by the interrupting subscriber. In the embodiment shown in FIG. 4, provision is made to attenuate somewhat any echoes which will arise during the time the condition of double-talking exists. In addition to showing the echo suppressor and break-in arrangement associated with the west terminal (subscriber A), the east terminal (subscriber B) is also shown. The transmission medium is indicated generally by 105 and may include an active satellite repeater, a transmission line with long delay or other medium involving transmission delay.

Path 6 in FIG. 4, as in FIG. 1, connects the incoming signals to handset 16 of subscriber A through amplifier 17, hybrid 10, and line 12. Hybrid 10 terminates in network 14. Path 8, in addition to having attenuator 36 serially connected therein, also has an additional impedance 108 connected therein. A control 106 is connected between path 6 and a control 107 by lead 22. A control 109 is connected between path 8 and control 107 by lead 30. Control 107 is connected to echo suppressor control 18 and an impedance 108 by the leads 110 and 111, respectively. As in FIG. 1, echo suppressor control 18 of FIG. 4 is connected to path 6 and controls the operation of attenuator 36 via lead 37.

The eastern terminal, which is associated with subscriber B, contains elements which are identical to those contained in the west terminal. Thus, receiving path 112 is connected to a hybrid coil 113 through an isolation amplifier 114. Handset 115 of subscriber B is connected to hybrid 113 by line 116. Hybrid coil 113 terminates in a network 117. The echo supressor and the associated breakin means contained in the east terminal are indicated generally by box 118 and comprise the same arrangement and operation as that subscribed in conjunction with subscriber A.

Controls 106 and 109 (FIG. 4) each may contain the elements depicted in FIG. 1 such as: a nogad, a one-way amplifier, a bandpass filter, a full-wave rectifier, and a low-pass filter. Control 107 will perform the following logic. When signals are received in path 6 and subscriber A is silent control 107 will allow echo suppressor control 18 to activate attenuator 36 to thereby attenuate the echoes in path 8. If double-talking is present, control 107 will act to disable echo suppressor control 18 by means of lead 110, thereby reducing the attenuation introduced by attenuator 36 to zero. Moreover, 107 will act to insert impedance 108 into path 8 to attenuate somewhat the echoes which will arise in path 8 during the period of double-talking without impairing the intelligibility of the desired speech.

Figure 5:
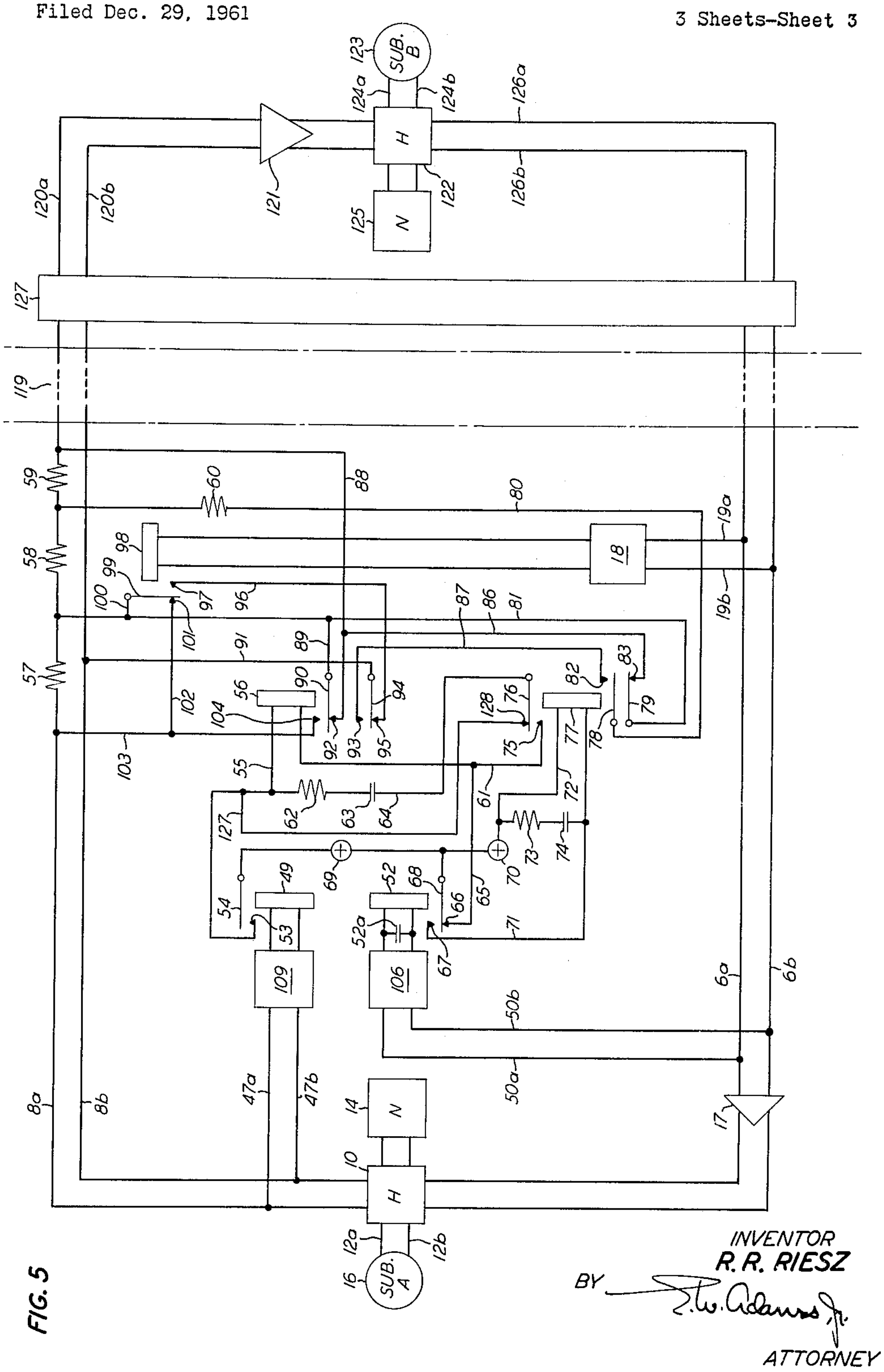
FIG. 5 is a schematic circuit diagram partially in block form showing how FIG. 4 may be implemented.

FIG. 5 discloses the arrangement of FIG. 4 in greater detail including means for implementing the control logic of control 107. FIG. 5 shows a full four-wire system interconnecting two two-wire subscriber loops. The signals received in leads 6A and 6B, which comprise the receiving path of the four-wire link, will be amplified by one-way amplifier 17 which is connected serially therein. These signals will be transmitted to handset 16 of subscriber A through hybrid coil 10 and the local two-wire transmission path comprising leads **12*a* and 12*b*. Network 14 is connected to and terminates hybrid coil 10. The transmission path, comprising leads 8*a* and 8*b*, is connected to hybrid coil 10. Impedances 57, 58 and 59 are serially connected in path 8*a***.

Control 106 of FIG. 5 is connected to path **6*a* and 6*b* by the leads 50*a* and 50*b*, respectively. The winding of a relay 52 is connected to the output of control 106. Similarly, control 109 is connected to paths 8*a* and 8*b* by leads 47*a* and 47*b*, respectively. The winding of a relay 49 is connected to the output of control 109. A capacitor 52*a* may be connected in parallel with the winding of relay 52 to compensate for any end delay in the two-wire link, as noted hereinabove in conjunction with FIG. 1. A source of potential 69 is connected between the armatures 54 and 68**.

The winding of a relay 56 is connected between contacts 53 and 75 by the leads 55 and 61, respectively. Lead 61 is also connected to contact 66 by a lead 65. The winding of a relay 77 is connected to one end of a source of potential 70 and to contact 67 by leads 72 and 71, respectively. The other end of source 70 is connected to armature 68. The series circuit comprising a resistor 73 and a capacitor 74 is connected between leads 72 and 71. The series circuit comprising a resistor 62 and a capacitor 63 is connected between an armature 76, by lead 64, and lead 55. A lead 127 is connected between lead 55 and a contact 128. Under normal circumstances (when the winding of relay 77 is de-energized) armature 76 will be connected to contact 128 thereby causing resistor 62 and capacitor 63 to be short circuited by lead 127.

One terminal of impedance 57 is connected to a contact 104 by a lead 103. A lead 81 is connected intermediate impedances 57 and 58 to armature 79. Armature 90 is joined to lead 81 by a lead 89. A lead 91 is connected between lead **8*b* and armature 94. A lead 87 connects contacts 82 and 93. A lead 96 joins contacts 95 and 97**.

An impedance 60 is serially connected in a lead 80 which is joined to the common terminals of impedances 58 and 59 at one end and to armature 78 at the other end. A lead 88 connects the other terminal of impedance 59 to contact 92. Lead 88 is further connected to contact 83 by a lead 86.

Echo suppressor control 18 is connected to leads **6*a* and 6*b* by lead 19*a* and 19*b*, respectively. The output of control 18 is connected to the winding of a relay 98 which controls the operation of armature 99. Armature 99 is connected to lead 81 by lead 100. Lead 102 joins contact 101 to lead 103**.

The transmitting medium, indicated generally by 119 in FIG. 5, may be any of the aforementioned types. The receiving path of the four-wire system at the east terminal comprises leads **120*a* and 120*b* and is connected through one-way amplifier 121 to hybrid coil 122. Handset 123 of subscriber B is connected to hybrid coil 122 by the two-wire path comprising leads 124*a* and 124*b*. Hybrid coil 122 terminates in network 125. The transmitting path of the four-wire link associated with subscriber B comprises leads 126*a* and 126*b* and is connected between hybrid coil 122 and transmitting medium 119. The echo suppressor and the breakin arrangement associated with subscriber B are identical to those described in conjunction with subscriber A and are indicated generally by box 127 connected across leads 120*a*, 120*b*, 126*a* and 126*b***.

Relay windings 49 and 52 control the action of armatures 54 and 68, respectively. When relay winding 49 is energized armature 54 will be connected to contact 53. This connection will be broken when winding 49 is de-energized. Armature 68 will be connected to contact 66 when relay winding 52 is de-energized and will be connected to contact 67 when relay winding 52 is energized.

Relay 56 controls the action of armatures 90 and 94. Armature 90 will be connected to contact 92 and armature 94 will be connected to contact 95 when relay winding 56 is de-energized. Armature 90 will be connected to contact 104 and armature 94 will be connected to contact 93 when relay winding 56 is energized.

Relay 77 controls the operation of armatures 76, 78 and 79. When relay winding 77 is de-energized, armatures 76 and 78 will not be connected in the circuit but armature 79 will be connected to contact 83. When relay winding 77 is energized armature 76 will be connected to contact 75 and armature 78 will be connected to contact 82 whereas armature 79 will be disconnected from contact 83.

The operation of the circuitry of FIG. 5 will now be disclosed for four cases: (1) when there is no speech in either the receiving or transmitting path; (2) when subscriber A alone is talking; (3) when subscriber B alone is talking; (4) when subscribers B and A are talking.

*Case 1.—No speech in either path*

When there is no speech in either the receiving path of the four-wire link comprising leads 6A and 6B or the transmitting path comprising leads **8*a* and 8*b*, relays 52 and 49 will be de-energized. Thus, source 69 will not be connected to the winding of relay 56 because armature 54 will not be connected to contact 53. Source 70 will not be connected to the winding of relay 77 because contact 67 will not be connected to armature 68. Thus, relays 56 and 77 will both be de-energized. Since there is no speech in the receiving path echo suppressor control 18 will not produce an output, therefore relay 98** will likewise be de-energized.

For this case, wherein all the relays are de-energized, a short circuit comprising lead 103, lead 102, contact 101, armature 99, lead 100, and lead 81 will be placed in parallel with impedance 57. Likewise, impedances 58 and 59 will be shorted due to the connection comprising lead 88, contact 92, armature 90, lead 89 and lead 81. Another short circuit path about impedances 58 and 59 will comprise lead 88, lead 86, contact 83, armature 79 and lead 81. Impedance 60, connected in lead 80, will not be connected in the circuit since an open circuit will exist between armature 78 and contact 82.

Thus, for this case, impedances 57, 58 and 59 will be effectively short circuited and signals may be transmitted over leads **8*a* and 8*b*** without attenuation.

*Case 2.—Subscriber A alone speaking*

When only subscriber A is speaking signals will exist on leads **8*a* and 8*b* which will cause relay 49 to be energized through control circuit 109. Source 69 will be connected to the winding of relay 56 through the circuit comprising source 69, armature 54, contact 53, leads 55, 61 and 65, contact 66, and armature 68. Resistor 62 and capacitor 63 will be short circuited, as noted hereinabove. Lead 127 serves to immediately discharge the capacitor 63 when only subscriber A is speaking; otherwise the action of relay 56 will be delayed at a time when no delay should be present. Furthermore, relay 77 will still be de-energized since source 70 will not be connected thereto because an open circuit will remain between contact 67 and armature 68**.

Again, since there are no signals in the receiving path, relay 98 will remain de-energized and armature 99 will therefore remain connected to contact 101. However, the application of source 69 to the winding of relay 56 will energize this relay and cause the armatures controlled by this relay to be activated.

Impedance 57, as in Case 1, will still be shorted by the circuit comprising leads 103 and 102, contact 101, armature 99, and leads 100 and 81. A further short across this impedance will exist through the path comprising lead 103, contact 104, armature 90, and leads 89 and 81. As in Case 1, impedances 58 and 59 will remain shorted through the circuit comprising leads 88 and 86, contact 83, armature 79, and lead 81. Likewise, impedance 60 will not be connected in the circuit as armature 78 will not be connected to contact 82. Path **8*b* will be connected to contact 82 through the circuit comprising lead 91, armature 94, contact 93, and lead 87. However, an open circuit exists between 82 and 78 and therefore lead 8*b*** will not be connected to any other part of the circuit through these elements.

Hence, for the case where A alone is speaking, impedances 57, 58 and 59 will be effectively short circuited and no attenuation will be introduced in transmission paths **8*a* and 8*b***. The signals produced by subscriber A may therefore pass through the transmission medium without any attenuation.

*Case 3.—Subscriber B alone speaking*

The reception of signals in leads **6*a* and 6*b* due to subscriber B's speech will energize the winding of relay 52. This action will cause the winding of relay 77 to be energized by source 70 through the circuit comprising source 70, lead 72, lead 71, contact 67, and armature 68. Armatures 76 and 78 will thereupon be connected to their respective contacts 75 and 82 while armature 79 will be disconnected from contact 83**.

It is to be noted that if relay 52 is de-energized, thereby disconnecting source 70 from the winding of relay 77, there will be a delay before relay 77 is de-energized due to the action of the delay circuit comprising resistor 73 and capacitor 74, which is connected in parallel with the winding of relay 77. Futrhermore, the connection now existing between armature 76 and contact 75 will connect the delay circuit comrprising resistor 62 and capacitor 63 in parallel with the winding of relay 56. However, the winding of relay 56 will not be energized because source 69 will not be connected to either contact 53, through armature 54, or to contact 66, through armature 68.

The signals present in leads **6*a* and 6*b* will also cause signals to appear at the output of suppressor control 18. This output signal will energize relay 98 thereby causing armature 99 to be connected to contact 97. This action will cause a short circuit to exist across leads 8*a* and 8*b* through the circuit comprising lead 81, lead 100, armature 99, contact 97, lead 96, contact 95, armature 94, and lead 91. The short circuit which formerly existed across impedance 57 (as noted above) will be opened when the connection between contact 101 and armature 99 is broken, thereby placing impedance 57 in lead 8*a*. Impedance 57 is so chosen as to have the characteristic impedance of the transmission line to thereby terminate hybrid coil 10, thus preventing reflection of energy back through hybrid coil 10** to subscriber A.

As in Case 1, impedances 58 and 59 will still be shorted through the circuit comprising lead 88, contact 92, armature 90, and leads 89 and 81. Although impedance 60 will now be connected to contact 93 through the path comprising lead 80, armature 78, contact 82, and lead 87; armature 94 will not be connected to contact 93, with the result that impedance 60 will still be disconnected from transmission path 8a and 8b.

*Case 4.—Both subscribers B and A speaking*

It is assumed that subscriber B has been speaking and therefore the condition of the circuitry will be as in the preceding case (i.e., Case 3). When subscriber A begins speaking relay 49 will be energized thereby connecting armature 54 to contact 53. Since relays 52 and 77 have been energized (as noted above) the time delay circuits comprising resistor 62 and capacitor 63, and resistor 73 and capacitor 74, associated with relays 56 and 77, respectively, will cause these relays to remain energized a predetermined time interval after the energizing sources have been removed. If these circiuts were not included, relays 56 and 77 would de-energize whenever there was a pause between words or syllables in the speech signals of subscriber A or B, respectively, which would thereupon make the operation of the echo suppressor intermittent, with the result that the speech signals would be received by the listening subscriber as chopped bursts. Thus, these time delay circuits compensate for the pauses in the speech patterns of both subscribers.

The energization of the winding of relay 56 (which occurs when armature 68 is reconnected to contact 66) will cause impedance 57 to be shorted again through the circuit comprising leads 81 and 89, armature 90, contact 104 and lead 103. Albeit relay 98 will be energized due to the fact that signals will exist in leads 6a and 6b, leads 8a and 8b will no longer be shorted because armature 94 will not be connected to contact 95. Instead, impedance 60 will be connected across leads 8a and 8b through the circuit comprising lead 91, armature 94, contact 93, lead 87, contact 82, armature 78, and lead 80, which contains impedance 60 connected therein.

The short circuit which existed across impedances 58 and 59 will be opened because contact 83 will not be connected to armature 79 and an open circuit will exist between contact 92 and armature 90. The value of impedances 58, 59 and 60, which form a T pad when connected in the transmission path, are chosen so as to have the characteristic impedance of the transmission line and to therefore eliminate transmission irregularities which might otherwise be introduced by their presence.

If subscriber A had been speaking first and subscriber B had thereupon begun to speak, the condition described for case 2 would originally exist and thus the circuit operation would be reversed. That is, relay 56 would be energized first and thereafter relay 77 would have been energized to connect the T pad into the circuit and eliminate the short circuit between leads 8a and 8b.

Thus, applicant has provided, in the embodiment shown in FIG. 5, a novel means of providing a break-in method for use in conjunction with an echo suppressor wherein the interrupting speaker may be a weak talker and still disable the echo suppressor associated with his terminal and, at the same time, insert a small amount of attenuation in the transmission path to attenuate any echoes which might therein arise.

What is claimed is:

1. In a transmission system including at least two terminals interconnected by transmitting and receiving paths, an echo suppressor connected to said paths at each terminal for inserting attenuation in said transmitting path when signals are received in said receiving path from the other of said terminals, means for comparing the variation of signals in said paths with respect to time and for producing an output when the signals in said paths do not vary simultaneously, and means responsive to said output for disabling said echo suppressor.

2. In a transmission system including at least two terminals interconnected by transmitting and receiving paths, an echo suppressor connected to said paths at each terminal for inserting attenuation in said transmitting path when signals are received in said receiving path from the other of said terminals, filter means for detecting a portion of the syllabic energy in each of said paths, comparing means for comparing the coincidence of the time patterns of the output of said filter means and for producing an output when the time patterns of the syllabic energy bursts in the paths do not coincide, and disabling means responsive to said comparing means output for disabling said echo suppressor.

3. A device as defined in claim 2 and means responsive to the operation of said disabling means for inserting attenuation in the transmitting path.

4. A device as defined in claim 3 and means for maintaining said echo suppressor disabled for a predetermined interval after said comparing means output disappears.

5. In a transmission system including at least two terminals interconnected by transmitting and receiving paths having a predetermined characteristic impedance, echo suppressor means connected to said paths at each terminal for disabling said transmitting path and for terminating said transmitting path in an impedance equal to its characteristic impedance when signals are received in said receiving path from the other of said terminals, filter means for detecting a portion of the syllabic energy in each of said paths, comparing means for comparing the coincidence of the time patterns of the output for said filter means and for producing an output when the time patterns of the syllabic energy bursts in the paths do not coincide, and disabling means responsive to the output of said comparing means for disabling said echo suppressor means.

6. In a transmission system including at least two terminals interconnected by transmitting and receiving paths, an echo suppressor connected to said paths at each terminal for inserting attenuation in said transmitting path when signals are received in said receiving path from the other of said terminals, a pair of filter means associated respectively with said paths for deriving a portion of the syllabic energy content in that path, a pair of two state devices connected respectively to the outputs of said filter means, each of said devices changing from a first state to a second state in the presence of syllabic energy, and means for disabling said echo suppressors when said devices are in different states.

7. In a transmission system including at least two terminals interconnected by transmitting and receiving paths, an echo suppressor connected to said paths at each terminal for inserting attenuation in said transmitting path when signals are received in said receiving path from the other of said terminals, a pair of filter means associated respectively with said paths for deriving a portion of the syllabic energy content in that path, a pair of two state devices connected respectively to the outputs of said filter means, each of said devices changing from a first state to a second state in the presence of syllabic energy, and means for disabling said echo suppressor when the device associated with said transmitting path is in said second state and the device associated with said receiving path is in the first state.

References Cited by the Examiner

UNITED STATES PATENTS

| | | | |
|---|---|---|---|
| 2,040,970 | 5/1936 | Abraham et al. | 179—170.6 |
| 2,356,943 | 8/1944 | Norwine | 179—170.6 |
| 2,496,186 | 1/1950 | Walter | 179—170.8 |

ROBERT H. ROSE, *Primary Examiner.*

WALTER L. LYNDE, *Examiner.*